US008790205B2

(12) United States Patent
Yang

(10) Patent No.: US 8,790,205 B2
(45) Date of Patent: Jul. 29, 2014

(54) MULTI-CVT DRIVE SYSTEM HAVING EPICYCLE GEAR SET

(76) Inventor: Tai-Her Yang, Dzan-Hwa (TW)

(*) Notice: Subject to any disclaimer, the term of this patent is extended or adjusted under 35 U.S.C. 154(b) by 237 days.

(21) Appl. No.: 13/403,198

(22) Filed: Feb. 23, 2012

(65) Prior Publication Data

US 2013/0225348 A1  Aug. 29, 2013

(51) Int. Cl.
*F16H 37/08* (2006.01)

(52) U.S. Cl.
USPC ............... 475/24; 475/25; 475/221; 475/225

(58) Field of Classification Search
USPC ............... 475/201, 225, 24, 25, 221
See application file for complete search history.

(56) References Cited

U.S. PATENT DOCUMENTS 2,332,838 A * 10/1943 Borgward .................. 475/25
4,997,412 A * 3/1991 Reed ......................... 475/24
2004/0048714 A1 * 3/2004 Phelan et al. ............. 475/225

* cited by examiner

*Primary Examiner* — Sherry Estremsky
(74) *Attorney, Agent, or Firm* — Bacon & Thomas, PLLC

(57) ABSTRACT

The present invention utilizes the rotary kinetic power of a rotary kinetic power source to directly drive the epicyclic gear set, or to drive the epicyclic gear set through a transmission device, then a continuous variable transmission (CVT) is individually installed between two output shafts of the epicyclic gear set and the load driven thereby, so the wheel set of the driven load is enabled to randomly perform variation of the driving speed ratio and the driving torque, so as to drive the combined common load; between the output ends of the mentioned two continuous variable transmissions, a limited slip differential or a stabilize device composed of a dual shaft connecting device having slip coupling torque can be further installed according to actual needs.

16 Claims, 4 Drawing Sheets

US 8,790,205 B2

MULTI-CVT DRIVE SYSTEM HAVING EPICYCLE GEAR SET

BACKGROUND OF THE INVENTION (a) Field of the Invention

The present invention provides a multi-CVT drive system having epicyclic gear set, which utilizes the rotary kinetic power of a rotary kinetic power source to directly drive the epicyclic gear set, or to drive the epicyclic gear set through a transmission device, then a continuous variable transmission (CVT) is individually installed between two output shafts of the epicyclic gear set and the load driven thereby, so the wheel set of the driven load is enabled to randomly perform variation of the driving speed ratio and the driving torque, so as to drive the combined common load; between the output ends of the mentioned two continuous variable transmissions, a limited slip differential or a stabilize device composed of a dual shaft connecting device having slip coupling torque can be further installed according to actual needs, so when differential operation is performed between the two loads, the stabilize device can be served to stable the operation of the drive system.

(b) Description of the Prior Art

When a conventional single power performs differential driving to two or more than two of individual loads of a common load body, a differential wheel set is often used for achieving the function of differential speed, the mentioned means has a shortage of not being able to generate the torque differential between the two loads.

SUMMARY OF THE INVENTION

The present invention provides a multi-CVT drive system having epicyclic gear set, which utilizes the rotary kinetic power of a rotary kinetic power source to directly drive the epicyclic gear set, or to drive the epicyclic gear set through a transmission device, then a continuous variable transmission (CVT) is individually installed between two output shafts of the epicyclic gear set and the load driven thereby, so the wheel set of the driven load is enabled to randomly perform variation of the driving speed ratio and the driving torque, so as to drive the combined common load; between the output ends of the mentioned two continuous variable transmissions, a limited slip differential or a stabilize device composed of a dual shaft connecting device having slip coupling torque can be further installed according to actual needs, so when differential operation is performed between the two loads, the stabilize device can be served to stable the operation of the drive system.

DESCRIPTION OF MAIN COMPONENT SYMBOLS

CL100、CL200、CL300、CL400、CL500、CL600: clutch device

Figure 1:
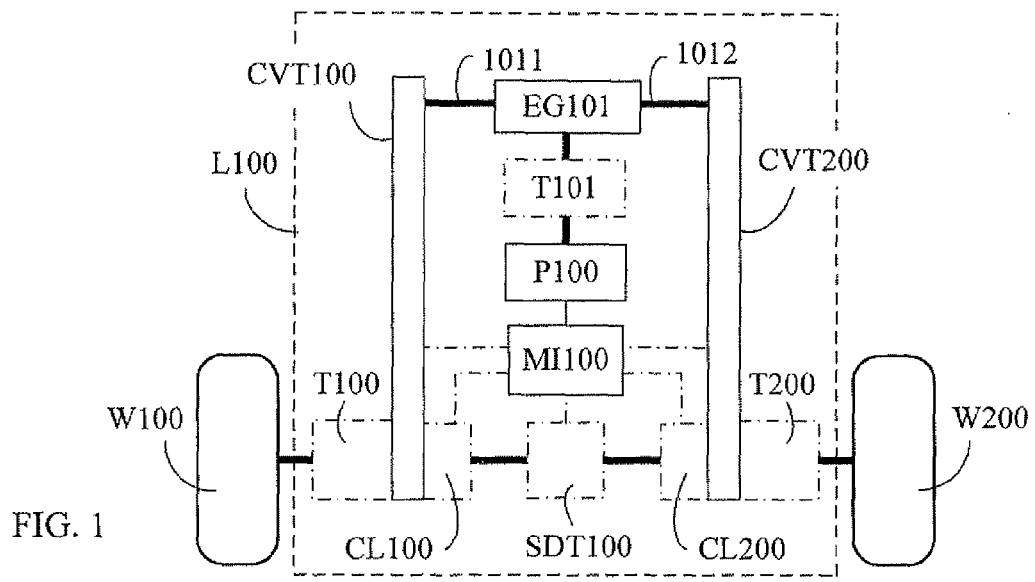
FIG. 1 is a schematic view illustrating the common load body (L100) being installed with a first epicyclic gear set (EG101) driven by the rotary kinetic power of a rotary kinetic power source (P100), a continuous variable transmission (CVT100) being installed between a left end output shaft (1011) of the first epicyclic gear set (EG101) and a left side wheel set (W100) of the loading end, and a continuous variable transmission (CVT200) being installed between a right end output shaft (1012) and a right side wheel set (W200), according to one embodiment of the present invention.

CVT100、CVT200、CVT300、CVT400、CVT500、CVT600: continuous variable transmission
EG101: first epicyclic gear set
EG102: second epicyclic gear set
EG103: third epicyclic gear set
1011、1021、1031: left end output shaft
1012、1022、1032: right end output shaft
L100: common load body
MI 100: operation interface
P100: rotary kinetic power source
SDT100、SDT200、SDT300: stabilize device
T100、T101、T200、T300、T400、T500、T600: transmission device
W100、W200、W300、W400、W500、W600: wheel set

DETAILED DESCRIPTION OF THE PREFERRED EMBODIMENTS

When a conventional single power performs differential driving to two or more than two of individual loads of a common load body, a differential wheel set is often used for achieving the function of differential speed, the mentioned means has a shortage of not being able to generate the torque differential between the two loads.

The present invention provides a multi-CVT drive system having epicyclic gear set, which utilizes the rotary kinetic power of a rotary kinetic power source to directly drive the epicyclic gear set, or to drive the epicyclic gear set through a transmission device, then a continuous variable transmission (CVT) is individually installed between two output shafts of the epicyclic gear set and the load driven thereby, so the wheel set of the driven load is enabled to randomly perform variation of the driving speed ratio and the driving torque, so as to drive the combined common load; the mentioned common load body (L100) is mainly defined as the frame body of a vehicle, and is installed with a rotary kinetic power source, relative operation and transmission interface devices, and installed with loading wheel sets driven by the rotary kinetic power source and installed with non-powered wheels not being driven by the rotary kinetic power source (P100) according to actual needs, thereby jointly carrying the common load body (L100).

According to the multi-CVT drive system having epicyclic gear set, a limited slip differential or a stabilize device composed of a dual shaft connecting device having slip coupling torque can be further installed at opposite locations horizontally and coaxially defined at two sides along the driving direction of the common load body (L100) and between the same transmission operation sets, and when the differential operation is performed between two loads, the stabilize device is served to stabilize the operation of the drive system; the stabilize device includes a limited slip differential, or a coupling torque dual shaft connecting device composed of a coupling device having slip damp, e.g. a dual shaft structure configured by fluid viscous effect, hydrodynamic damp effect, mechanical friction effect, electromagnetic vortex effect or power generation reverse torque effect, and two rotating ends of the stabilize device are respectively connected to: one or more than one location of the opposite locations horizontally and coaxially defined on the following transmission operation sets, including:
(1) installed between wheel set rotation parts oppositely at the left side and the right side;
(2) installed between opposite output ends of the continuous variable transmissions at the left side and the right side;
(3) installed between opposite output ends of clutch devices at the left side and the right side;
(4) installed between the input end or the output end oppositely at the left side and the right side of the transmission device;
(5) installed between the rotation parts at left side and the right side of the wheel set;

By installing the mentioned stabilize device for the driving operation, when the load varying at individual loading end, or the control required by the operation state of the opposite continuous variable transmissions, or the unstable state during operation, the stabilize device can be served to stabilize the system; the stabilize device can be optionally installed according to actual needs.

According to the multi-CVT drive system having epicyclic gear set, between the input end of individual continuous variable transmission to the wheel set of the loading end, a stepped or continuous variable transmission having fixed speed ratio for acceleration or deceleration or changing direction can be further installed at one or more than one of following locations, including:
(1) installed at the input end of the continuous variable transmission;
(2) installed at the output end of the continuous variable transmission;
(3) installed at the input end of the clutch device;
(4) installed at the output end of the clutch device;
(5) installed at the input end of the wheel set at the loading end;

The mentioned transmission device is consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the transmission device can be optionally installed according to actual needs.

According to the multi-CVT drive system having epicyclic gear set, between the input end of individual continuous variable transmission and the wheel set of the loading end, a clutch device can be further installed at one or more than one of following locations, including:
(1) installed at the input end of the continuous variable transmission;
(2) installed at the output end of the continuous variable transmission;
(3) installed at the input end of the clutch transmission device;
(4) installed at the output end of the clutch transmission device; installed at the input end of the wheel set at the loading end;

The mentioned clutch device is controlled by manual force or centrifugal force, or controlled by the operation interface, and can be served as a clutch device or structure having function of performing transmission engaging or releasing while being driven by electric force and/or magnetic force and/or mechanical force and/or pressure and/or hydraulic force, and has a rotary input end and a rotary output end; the clutch device can be optionally installed upon actual requirements;

The multi-CVT drive system having epicyclic gear set of the present invention can be applied to the wheel type vehicles, or track type vehicles, or rail vehicles, or ships driven by at least two individual motors, or human flow or logistics conveyors, or industrial equipments driven by at least two motor sets.

Embodiments according to the present invention are illustrated as followings:

FIG. 1 is a schematic view illustrating the common load body (L100) being installed with a first epicyclic gear set (EG101) driven by the rotary kinetic power of a rotary kinetic power source (P100), a continuous variable transmission (CVT100) being installed between a left end output shaft (1011) of the first epicyclic gear set (EG101) and a left side wheel set (W100) of the loading end, and a continuous variable transmission (CVT200) being installed between a right end output shaft (1012) and a right side wheel set (W200), according to one embodiment of the present invention.

As shown in FIG. 1, the present invention utilizes the rotary output end of the rotary kinetic power source (P100) of the common load body (L100) to directly or through the transmission device (T101) to drive the first epicyclic gear set (EG101), and the continuous variable transmission (CVT100) is installed between the left end output shaft (1011) of the two output ends of the first epicyclic gear set (EG101) and the left side wheel set (W100) of the loading end of the common load body (L100), and the continuous variable transmission (CVT200) is installed between the right end output shaft (1012) of the two output ends of the first epicyclic gear set (EG101) and the right side wheel set (W200), thereby forming the drive system capable of being operated in the differential speed and variable speed state, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the first epicyclic gear set (EG101); the transmission device (T101) can be optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts capable of differentially operating is served to drive the input end of the continuous variable transmission (CVT100), the right end output shaft (1012) is served to drive the input end of the continuous variable transmission (CVT200);

continuous variable transmission (CVT100), (CVT200): the continuous variable transmission (CVT) is in the structural configuration capable of automatically changing speed ratio upon passively receiving the driving rotational speed and/or the loading torque, or is subject to the external control to actively change speed ratio, such as a rubber belt type, metal belt type, chain type continuous variable transmission, or an electric continuous variable transmission (ECVT), or a friction disk type, or a conventional different-shaft type continuous variable transmission;

operation interface (MI100): related to a linear analog type, or digital type or hybrid type control device, and constituted by an operation mechanism and/or electromechanical device and/or solid state electric circuit, provided for controlling the operation status of the rotary kinetic power source (P100), and/or controlling the operation of the continuous variable transmission (CVT100) and/or the continuous variable transmission (CVT200);

stabilize device (SDT100): constituted by a limited slip differential, or a dual shaft connecting device composed of a coupling device having slip damp coupling torque, including a stabilize device with the dual shaft structure configured through fluid viscous effect, hydrodynamic damp effect, mechanical friction effect, electromagnetic vortex effect or power generation reverse torque effect; wherein two rotating ends thereof are respectively connected between the left side wheel set (W100) and the right side wheel set (W200) of the loading end; during the driving operation, if the load varying at the individual two sides of the loading end causes the unstable operation, with the slip damp coupling torque of the stabilize device (SDT100) installed between the wheel sets at the left and right sides, the operation of the system can be stabilized; the stabilize device (SDT100) can be optionally installed according to actual needs;

According to the embodiment disclosed in FIG. 1, the input end or the output end of the continuous variable transmission (CVT) or the input end of the wheel set can be further installed with a transmission device, wherein:

transmission device (T100), (T200): the output end of the transmission device (T100) is served to drive the left side wheel set (W100) of the loading end, and the input end thereof is driven by the rotary kinetic power from the output end of the continuous variable transmission (CVT100); the output end of the transmission device (T200) is served to drive the right side wheel set (W200), and the input end thereof is driven by the rotary kinetic power from the output end of the continuous variable transmission (CVT200); the transmission device (T100) and the transmission device (T200) are consisted of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter; the transmission devices (T100), (T200) can be optionally installed according to actual needs;

According to the embodiment disclosed in FIG. 1, between the output end of the continuous variable transmission individually installed on individual wheel set and the loading end, a clutch device can be further installed between the output end of the continuous variable transmission to the transmission chain of the input end of the wheel set used for distal driving, wherein:

clutch device (CL100), (CL200): the clutch device (CL100) is installed between the output end of the continuous variable transmission (CVT100) and the wheel set (W100) for controlling the continuous variable transmission (CVT100) to output the rotary kinetic power to the wheel set (W100), and the clutch device (CL200) is installed between the output end of the continuous variable transmission (CVT200) and the wheel set (W200) for controlling the continuous variable transmission (CVT200) to output the rotary kinetic power to the wheel set (W200); the clutch device (CL100) and the clutch device (CL200) include being controlled by manual force or centrifugal force, or controlled through the operation interface (MI100), and formed as a clutch device or structure driven by electric force and/or magnetic force and/or mechanical force and/or pressure and/or hydraulic force for performing transmission engaging or releasing, and having a rotary input end and a rotary output end; the clutch devices (CL100, CL200) can be optionally installed upon actual needs;

According to the embodiment shown in FIG. 1, the common load body (L100) can be provided with one or more than one non-powered wheels according to actual needs;

With the operation of the mentioned devices, when the common load body (L100) is driven to operate by the rotary kinetic power source (P100), and the left side wheel set (W100) and the right side wheel set (W200) of the loading end are operated in differential speeds, the speed ratios of the continuous variable transmission (CVT100) and the continuous variable transmission (CVT200) are individually adjusted along with the load varying of the wheel set (W100) and the wheel set (W200) of the loading end, and the two output ends of the first epicyclic gear set (EG101) perform differential operation for adjustment, so as to drive in differential speed between the input end of the continuous variable transmission (CVT100) and the input end of the continuous variable transmission (CVT200).

Figure 2:
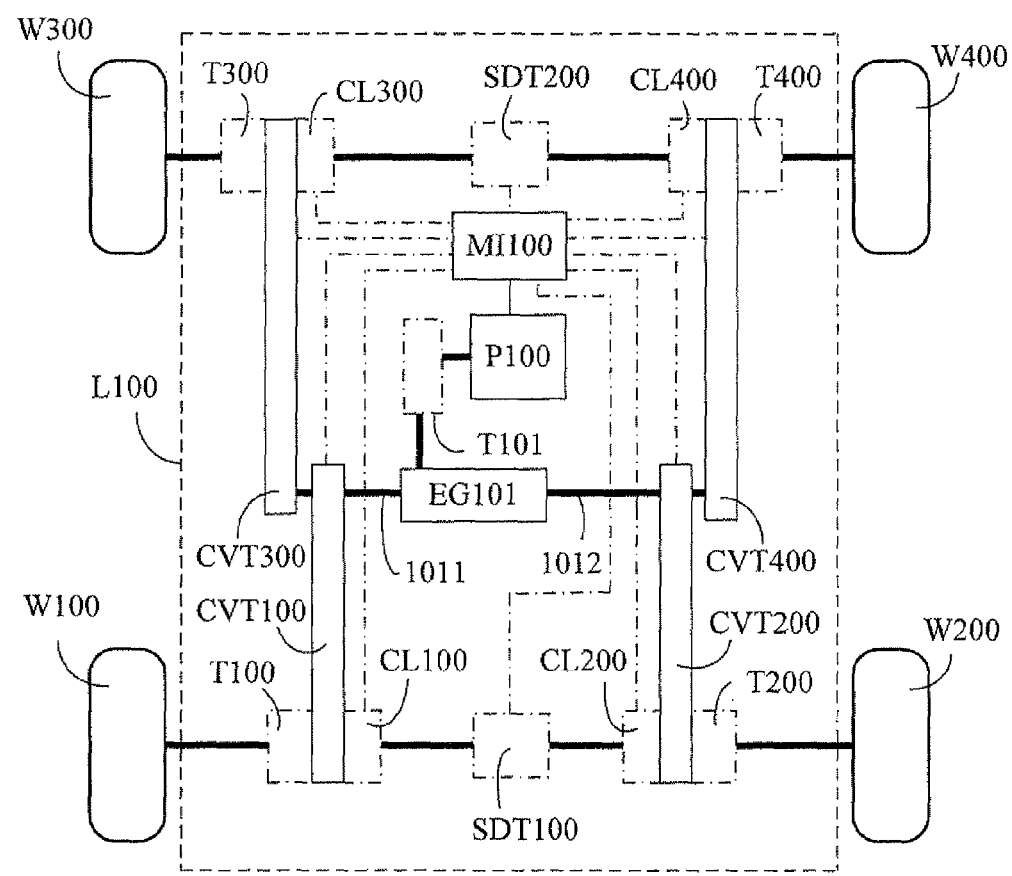
FIG. 2 is schematic view illustrating a continuous variable transmission (CVT100) and a continuous variable transmission (CVT300) being individually installed between left end output shaft (1011) of the first epicyclic gear set (EG101) of FIG. 1 and the wheel set (W100) at the rear left side of the loading end and the wheel set (W300) at the front left side, and a continuous variable transmission (CVT200) and a continuous variable transmission (CVT400) being individually installed between the right end output shaft (1012) and the wheel set (W200) at the rear right side of the loading end and the wheel set (W400) at the front right side, according to one embodiment of the present invention.

FIG. 2 is schematic view illustrating a continuous variable transmission (CVT100) and a continuous variable transmission (CVT300) being individually installed between left end output shaft (1011) of the first epicyclic gear set (EG101) of FIG. 1 and the wheel set (W100) at the rear left side of the loading end and the wheel set (W300) at the front left side, and a continuous variable transmission (CVT200) and a continuous variable transmission (CVT400) being individually installed between the right end output shaft (1012) and the wheel set (W200) at the rear right side of the loading end and the wheel set (W400) at the front right side, according to one embodiment of the present invention;

As shown in FIG. 2, the present invention utilizes the rotary output end of the rotary kinetic power source (P100) of the common load body (L100) to directly or through the transmission device (T101) to drive the first epicyclic gear set (EG101), and the continuous variable transmission (CVT100) and the continuous variable transmission (CVT300) are respectively installed between the left end output shaft (1011) of the two output ends of the first epicyclic gear set (EG101) and the wheel set (W100) at the rear left side and the wheel set (W300) at the front left side of the loading end at the left side of the common load body (L100), and the continuous variable transmission (CVT200) and the continuous variable transmission (CVT400) are installed between the right end output shaft (1012) and the wheel set (W200) at the rear right side and the wheel set (W400) at the front right side of the loading end at the right side of the common load body (L100), thereby forming the drive system capable of being operated in the speed differential state, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the first epicyclic gear set (EG101); the transmission device (T101) can be optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts capable of differentially operating is served to drive the input ends of the continuous variable transmission (CVT100) and the continuous variable transmission (CVT300), and the right end output shaft (1012) thereof is served to drive the input ends of the continuous variable transmission (CVT200) and the continuous variable transmission (CVT400);

continuous variable transmission (CVT100), (CVT200), (CVT300), (CVT400): the continuous variable transmission (CVT) is in the structural configuration capable of automatically changing speed ratio upon passively receiving the driving rotational speed and/or the loading torque, or is subject to the external control to actively change speed ratio, such as a rubber belt type, metal belt type, chain type continuous variable transmission, or an electric continuous variable transmission (ECVT), or a friction disk type, or a conventional different-shaft type continuous variable transmission;

operation interface (MI100): related to a linear analog type, or digital type or hybrid type control device, and constituted by an operation mechanism and/or electromechanical device and/or solid state electric circuit, provided for controlling the operation status of the rotary kinetic power source (P100), and/or controlling the operation of the continuous variable transmission (CVT 100) and/or the continuous variable transmission (CVT200) and/or the continuous variable transmission (CVT300) and/or the continuous variable transmission (CVT400);

stabilize device (SDT100), (STD200): constituted by a limited slip differential, or a dual shaft connecting device composed of a coupling device having slip damp coupling torque, including a stabilize device with the dual shaft structure configured through fluid viscous effect, hydrodynamic damp effect, mechanical friction effect, electromagnetic vortex effect or power generation reverse torque effect; wherein two rotating ends of the stabilize device (SDT100) are respectively connected between the wheel set (W100) at the rear left side and the wheel set (W200) at the rear right side of the loading end, and two rotating ends of the stabilize device (SDT200) are respectively connected between the wheel set (W300) at the front left side and the wheel set (W400) at the front right side of the loading end; during the driving operation, if the load varying at the individual two sides of the loading end causes the unstable operation, with the slip damp coupling torque of the stabilize device (SDT100) and/or the stabilize device (SDT200) installed between the two opposite wheel sets at the left and right sides, the operation of the system can be stabilized; the stabilize device (SDT100) and/or the stabilize device (SDT200) can be optionally installed according to actual needs;

According to the embodiment disclosed in FIG. 2, the input end or the output end of the continuous variable transmission or the input end of the wheel set can be further installed with a transmission device, wherein:

transmission device (T100), (T200), (T300), (T400): the output end of the transmission device (T100) is served to drive the wheel set (W100) at the rear left side of the loading end, and the input end thereof is driven by the rotary kinetic power from the output end of the continuous variable transmission (CVT100); the output end of the transmission device (T200) is served to drive the wheel set (W200) at the rear right side, and the input end thereof is driven by the rotary kinetic power from the output end of the continuous variable transmission (CVT200); the output end of the transmission device (T300) is served to drive the wheel set (W300) at the front left side of the loading end, and the input end thereof is driven by the rotary kinetic power from the output end of the continuous variable transmission (CVT300); the output end of the transmission device (T400) is served to drive the wheel set (W400) at the front right side, and the input end thereof is driven by the rotary kinetic power from the output end of the continuous variable transmission (CVT400); the transmission devices (T100), (T200), (T300), (T400) are consisted of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter; the transmission device s (T100), (T200) and/or (T300), (T400) can be optionally installed according to actual needs;

According to the embodiment disclosed in FIG. 2, between the output end of the continuous variable transmission individually installed on individual wheel set and the loading end, a clutch device can be further installed between the output end of the continuous variable transmission to the transmission chain of the input end of the wheel set used for distal driving, wherein:

clutch device (CL100), (CL200), (CL300), (CL400): the clutch device (CL100) is installed between the output end of the continuous variable transmission (CVT100) and the wheel set (W100) for controlling the continuous variable transmission (CVT100) to output the rotary kinetic power to the wheel set (W100), the clutch device (CL200) is installed between the output end of the continuous variable transmission (CVT200) and the wheel set (W200) for controlling the continuous variable transmission (CVT200) to output the rotary kinetic power to the wheel set (W200), the clutch device (CL300) is installed between the output end of the continuous variable transmission (CVT300) and the wheel set (W300) for controlling the continuous variable transmission (CVT300) to output the rotary kinetic energy to the wheel set (W300), and the clutch device (CL400) is installed between the output end of the continuous variable transmission (CVT400) and the wheel set (W400) for controlling the continuous variable transmission (CVT400) to output rotation kinetic energy to the wheel set (W400); the clutch devices (CL100), (CL200), (CL300), (CL400) include being controlled by manual force or centrifugal force, or controlled through the operation interface (MI100), and formed as a clutch device or structure driven by electric force and/or magnetic force and/or mechanical force and/or pressure and/or hydraulic force for performing transmission engaging or releasing, and having a rotary input end and a rotary output end; the clutch devices (CL100, CL200, CL300, CL400) can be optionally installed upon actual needs;

According to the embodiment shown in FIG. 2, the common load body (L100) can be provided with one or more than one non-powered wheels according to actual needs;

With the operation of the mentioned devices, when the common load body (L100) is driven to operate by the rotary kinetic power source (P100), and the wheel set (W100) at the rear left side and the wheel set (W200) at the rear right side of the loading end are operated in differential speeds, the speed ratios of the continuous variable transmission (CVT100) and the continuous variable transmission (CVT200) are individually adjusted along with the load varying of the wheel set (W100) and the wheel set (W200) of the loading end, and the two output ends of the first epicyclic gear set (EG101) perform differential operation for adjustment, so as to drive in differential speed between the input end of the continuous variable transmission (CVT100) and the input end of the continuous variable transmission (CVT200); when the wheel set (W300) at the front left side and the wheel set (W400) at the front right side of the loading end are operated in differential speeds, the speed ratios of the continuous variable transmission (CVT300) and the continuous variable transmission (CVT400) are individually adjusted along with the load varying of the wheel set (W300) and the wheel set (W400) of the loading end, and the left end output shaft (1011) and the right end output shaft (1012) of the two output ends of the first epicyclic gear set (EG101) perform differential operation for adjustment so as to drive in differential speed between the input end of the continuous variable transmission (CVT300) and the input end of the continuous variable transmission (CVT400); if the operation in differential speed are performed between the wheel set (W100) and the wheel set (W200) and between the wheel set (W300) and the wheel set (W400) at the same time, the interactive differential operation is jointly formed between the continuous variable transmission (CVT100) and the continuous variable transmission (CVT200) and between the continuous variable transmission (CVT300) and the continuous variable transmission (CVT400), and between the left end output shaft (1011) and the right end output shaft (1012) of the two output ends of the first epicyclic gear set (EG101).

Figure 3:
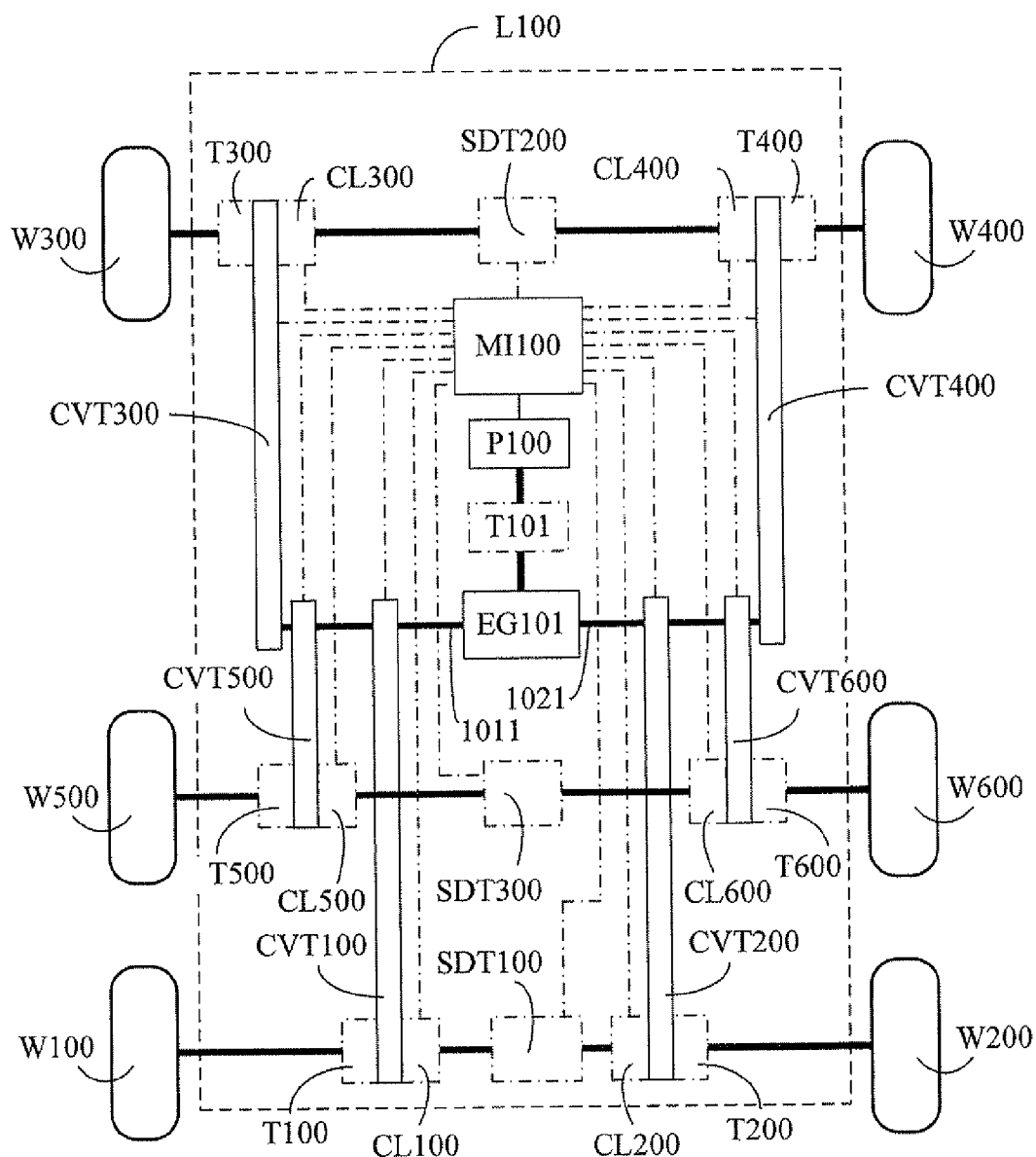
FIG. 3 is schematic view illustrating a continuous variable transmission (CVT100) and a continuous variable transmission (CVT300) and a continuous variable transmission (CVT500) being individually installed between the left end output shaft (1011) of the first epicyclic gear set (EG101) of FIG. 1 and the wheel set (W100) at the rear left side, the wheel set (W300) at the front left side and the wheel set (W500) at the middle left side of the loading end, and a continuous variable transmission (CVT200) and a continuous variable transmission (CVT400) and a continuous variable transmission (CVT600) being individually installed between the right end output shaft (1012) thereof and the wheel set (W200) at the rear right side, the wheel set (W400) at the front right side and the wheel set (W600) at the middle right side, according to one embodiment of the present invention.

FIG. 3 is schematic view illustrating a continuous variable transmission (CVT100) and a continuous variable transmission (CVT300) and a continuous variable transmission (CVT500) being individually installed between the left end output shaft (1011) of the first epicyclic gear set (EG101) of FIG. 1 and the wheel set (W100) at the rear left side, the wheel set (W300) at the front left side and the wheel set (W500) at the middle left side of the loading end, and a continuous variable transmission (CVT200) and a continuous variable transmission (CVT400) and a continuous variable transmission (CVT600) being individually installed between the right end output shaft (1012) thereof and the wheel set (W200) at the rear right side, the wheel set (W400) at the front right side and the wheel set (W600) at the middle right side, according to one embodiment of the present invention.

As shown in FIG. 3, the present invention utilizes the rotary output end of the rotary kinetic power source (P100) of the common load body (L100) to directly or through the transmission device (T101) to drive the first epicyclic gear set (EG101), and the continuous variable transmission (CVT100), the continuous variable transmission (CVT300) and the continuous variable transmission (CVT500) are respectively installed between the left end output shaft (1011) of the two output ends of the first epicyclic gear set (EG101) and the wheel set (W100) at the rear left side, the wheel set (W300) at the front left side and the wheel set (W500) at the middle left side of the loading end at the left side of the common load body (L100), and the continuous variable transmission (CVT200) and the continuous variable transmission (CVT400) and the continuous variable transmission (CVT600) are installed between the right end output shaft (1012) and the wheel set (W200) at the rear right side, the wheel set (W400) at the front right side and the wheel set (W600) at the middle right side of the loading end at the right side of the common load body (L100), thereby forming the drive system capable of being operated in the speed differential state, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the first epicyclic gear set (EG101); the transmission device (T101) can be optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts capable of differentially operating is served to drive the input ends of the continuous variable transmissions (CVT100), (CVT300), (CVT500), and the right end output shaft (1012) thereof is served to drive the input ends of the continuous variable transmissions (CVT200), (CVT400), (CVT600);

continuous variable transmission (CVT100), (CVT200), (CVT300), (CVT400), (CVT500), (CVT600): the continuous variable transmission (CVT) is in the structural configuration capable of automatically changing speed ratio upon passively receiving the driving rotational speed and/or the loading torque, or is subject to the external control to actively change speed ratio, such as a rubber belt type, metal belt type, chain type continuous variable transmission, or an electric continuous variable transmission (ECVT), or a friction disk type, or a conventional different-shaft type continuous variable transmission;

operation interface (MI100): related to a linear analog type, or digital type or hybrid type control device, and constituted by an operation mechanism and/or electromechanical device and/or solid state electric circuit provided for controlling the operation status of the rotary kinetic power source (P100), and/or controlling the operation of the continuous variable transmission (CVT100) and/or the continuous variable transmission (CVT200) and/or the continuous variable transmission (CVT300), and/or the continuous variable transmission (CVT400), and/or the continuous variable transmission (CVT500) and/or the continuous variable transmission (CVT600);

stabilize device (SDT100), (STD200), (STD300): constituted by a limited slip differential, or a dual shaft connecting device composed of a coupling device having slip damp coupling torque, including a stabilize device with the dual shaft structure configured through fluid viscous effect, hydrodynamic damp effect, mechanical friction effect, electromagnetic vortex effect or power generation reverse torque effect; wherein two rotating ends of the stabilize device (SDT100) are respectively connected between the wheel set (W100) at the rear left side and the wheel set (W200) at the rear right side of the loading end, two rotating ends of the stabilize device (SDT200) are respectively connected between the wheel set (W300) at the front left side and the wheel set (W400) at the front right side of the loading end, and two rotating ends of the stabilize device (SDT300) are respectively connected between the wheel set (W500) at the middle left side and the wheel set (W600) at the middle right side of the loading end; during the driving operation, if the load varying at the individual two sides of the loading end causes the unstable operation, with the slip damp coupling torque of the stabilize device (SDT100) and/or the stabilize device (SDT200) and/or the stabilize device (SDT300) installed between the two opposite wheel sets at the left and right sides, the operation of the system can be stabilized; the stabilize device (SDT100) and/or the stabilize device (SDT200) and/or the stabilize device (SDT300) can be optionally installed according to actual needs;

According to the embodiment disclosed in FIG. 3, the input end or the output end of the continuous variable transmission or the input end of the wheel set can be further installed with a transmission device, wherein:

transmission device (T100), (T200), (T300), (T400), (T500), (T600): the output end of the transmission device (T100) is served to drive the wheel set (W100) at the rear left side of the loading end, and the input end thereof is driven by the rotary kinetic power from the output end of the continuous variable transmission (CVT100); the output end of the transmission device (T200) is served to drive the wheel set (W200) at the rear right side, and the input end thereof is driven by the rotary kinetic power from the output end of the continuous variable transmission (CVT200); the output end of (T300) is served to drive the wheel set (W300) at the front left side of the loading end, and the input end thereof is driven by the rotary kinetic power from the output end of the continuous variable transmission (CVT300); the output end of the transmission device (T400) is served to drive the wheel set (W400) at the front right side, and the input end thereof is driven by the rotary kinetic power from the output end of the continuous variable transmission (CVT400); the output end of the transmission device (T500) is served to drive the wheel set (W500) at the middle left side of the loading end, and the input end thereof is driven by the rotary kinetic power from the output end of the continuous variable transmission (CVT500); the output end of the transmission device (T600) is served to drive the wheel set (W600) at the middle right side of the loading end, and the input end thereof is driven by the rotary kinetic power from the output end of the continuous variable transmission (CVT600); the transmission devices (T100), (T200), (T300), (T400), (T500), (T600) are consisted of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter; the transmission devices (T100), (T200) and/or (T300), (T400), (T500), (T600) can be optionally installed according to actual needs;

According to the embodiment disclosed in FIG. 3, between the output end of the continuous variable transmission individually installed on individual wheel set and the loading end, a clutch device can be further installed between the output end of the continuous variable transmission to the transmission chain of the input end of the wheel set used for distal driving, wherein:

clutch device (CL100), (CL200), (CL300), (CL400), (CL500), (CL600): the clutch device (CL100) is installed between the output end of the continuous variable transmission (CVT100) and the wheel set (W100) for controlling the continuous variable transmission (CVT100) to output the rotary kinetic power to the wheel set (W100), the clutch device (CL200) is installed between the output end of the continuous variable transmission (CVT200) and the wheel set (W200) for controlling the continuous variable transmission (CVT200) to output the rotary kinetic power to the wheel set (W200), the clutch device (CL300) is installed between the output end of the continuous variable transmission (CVT300) and the wheel set (W300) for controlling the continuous variable transmission (CVT300) to output the rotary kinetic energy to the wheel set (W300), the clutch device (CL400) is installed between the output end of the continuous variable transmission (CVT400) and the wheel set (W400) for controlling the continuous variable transmission (CVT400) to output the rotary kinetic energy to the wheel set (W400), the clutch device (CL500) is installed between the output end of the continuous variable transmission (CVT500) and the wheel set (W500) for controlling the continuous variable transmission (CVT500) to output the rotary kinetic power to the wheel set (W500), and the clutch device (CL600) is installed between the output end of the continuous variable transmission (CVT600) and the wheel set (W600) for controlling the continuous variable transmission (CVT600) to output the rotary kinetic power to the wheel set (W600); the clutch devices (CL100), (CL200), (CL300), (CL400), (CL500), (CL600) include being controlled by manual force or centrifugal force, or controlled through the operation interface (MI100), and formed as a clutch device or structure driven by electric force and/or magnetic force and/or mechanical force and/or pressure and/or hydraulic force for performing transmission engaging or releasing, and having a rotary input end and a rotary output end; the clutch devices (CL100, CL200, CL300, CL400, CL500, CL600) can be optionally installed upon actual needs;

According to the embodiment shown in FIG. 3, the common load body (L100) can be provided with one or more than one non-powered wheels according to actual needs;

With the operation of the mentioned devices, when the common load body (L100) is driven to operate by the rotary kinetic power source (P100), and the wheel set (W100) at the rear left side and the wheel set (W200) at the rear right side of the loading end are operated in differential speeds, the speed ratios of the continuous variable transmission (CVT100) and the continuous variable transmission (CVT200) are individually adjusted along with the load varying of the wheel set (W100) and the wheel set (W200) of the loading end, and the two output ends of the first epicyclic gear set (EG101) perform differential operation for adjustment, so as to drive in differential speed between the input end of the continuous variable transmission (CVT100) and the input end of the continuous variable transmission (CVT200); when the wheel set (W300) at the front left side and the wheel set (W400) at the front right side of the loading end are operated in differential speeds, the speed ratios of the continuous variable transmission (CVT300) and the continuous variable transmission (CVT400) are individually adjusted along with the load varying of the wheel set (W300) and the wheel set (W400) of the loading end, and the left end output shaft (1011) and the right end output shaft (1012) of the two output ends of the first epicyclic gear set (EG101) perform differential operation for adjustment so as to drive in differential speed between the input end of the continuous variable transmission (CVT300) and the input end of the continuous variable transmission (CVT400); accordingly, when the wheel set (W500) at the middle left side and the wheel set (W600) at the middle right side of the loading end are operated in differential speeds, the speed ratios of the continuous variable transmission (CVT500) and the continuous variable transmission (CVT600) are individually adjusted along with the load varying of the wheel set (W500) and the wheel set (W600) of the loading end, and the left end output shaft (1011) and the right end output shaft (1012) of the two output ends of the first epicyclic gear set (EG101) perform differential operation for adjustment, so as to drive in differential speed between the input end of the continuous variable transmission (CVT500) and the input end of the continuous variable transmission (CVT600); if the operation in differential speed are performed between the wheel set (W100) and the wheel set (W200) and/or between the wheel set (W300) and the wheel set (W400) and/or between the wheel set (W500) and the wheel set (W600) at the same time, the interactive differential operation is jointly formed between the continuous variable transmission (CVT100) and the continuous variable transmission (CVT200) and/or between the continuous variable transmission (CVT300) and the continuous variable transmission (CVT400) and/or between the continuous variable transmission (CVT500) and the continuous variable transmission (CVT600), and between the left end output shaft (1011) and the right end output shaft (1012) of the two output ends of the first epicyclic gear set (EG101).

According to the multi-CVT drive system having epicyclic gear set illustrated in previous embodiment accompanied with FIG. 1, FIG. 2 and FIG. 3, when more wheel sets sharing the same epicyclic gear set and having individual continuous variable transmission at the loading end, the structured system can be formed with the same means disclosed above, wherein the limited slip differential or the stabilize device composed of the dual shaft connecting device having slip coupling torque installed at opposite locations horizontally and coaxially defined at two sides along the driving direction of the common load body (L100) and between the same transmission operation sets, or the transmission device or clutch device installed between the individual CVT to the wheel set can be all or partially installed or none of the above is installed.

Figure 4:
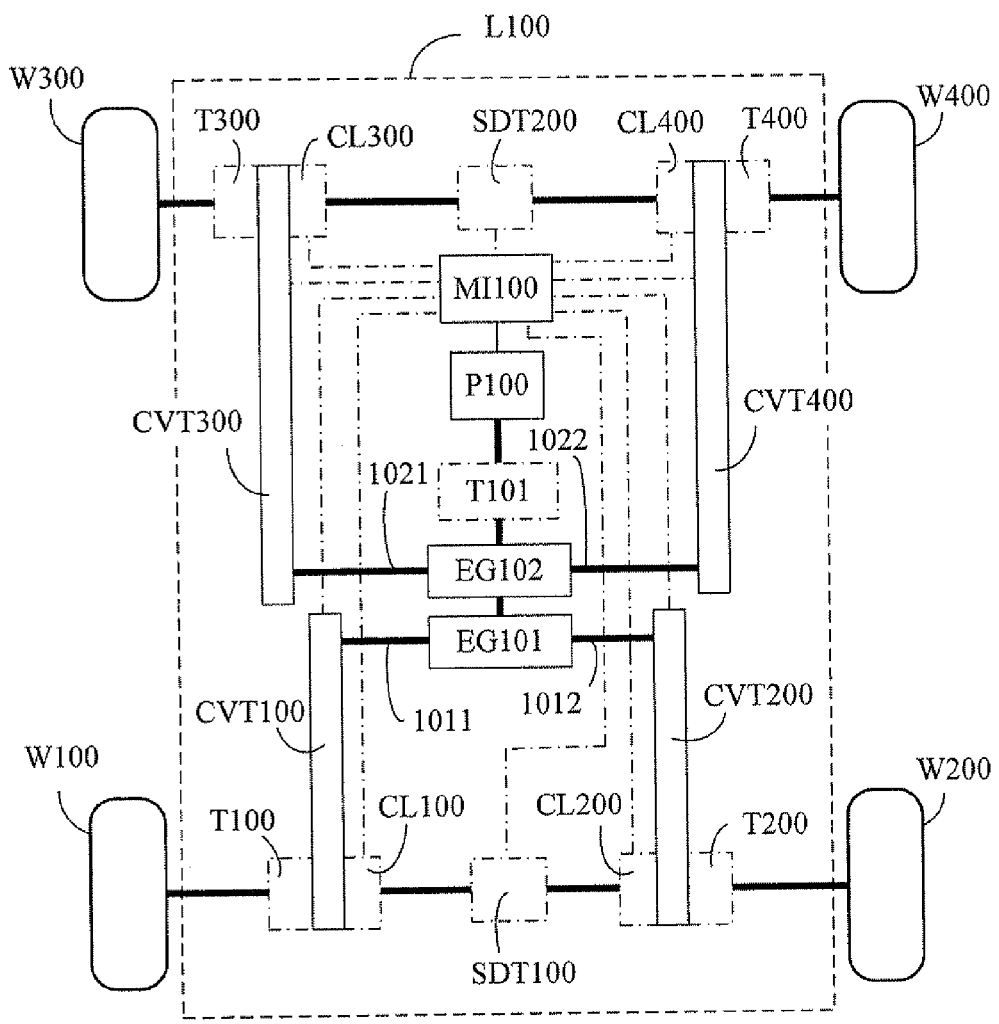
FIG. 4 is a schematic view illustrating FIG. 2 being further installed with a first epicyclic gear seat (EG101) and a second epicyclic gear set (EG102) driven by the rotary kinetic power of the rotary kinetic power source (P100), and a continuous variable transmission (CVT100) being installed between the left end output shaft (1011) of the first epicyclic gear set (EG101) and the wheel set (W100) at the rear left side of the loading end, a continuous variable transmission (CVT200) being installed between the right end output shaft (1012) and the wheel (W200) at the rear right side, and a continuous variable transmission (CVT300) being installed between the left end output shaft (1021) of the second epicyclic gear set (EG102) and the wheel set (W300) at the front left side, and a continuous variable transmission (CVT400) being installed between the right end output shaft (1022) and the wheel set (W400) at the front right side, according to one embodiment of the present invention.

FIG. 4 is a schematic view illustrating FIG. 2 being further installed with a first epicyclic gear seat (EG101) and a second epicyclic gear set (EG102) driven by the rotary kinetic power of the rotary kinetic power source (P100), and a continuous variable transmission (CVT100) being installed between the left end output shaft (1011) of the first epicyclic gear set (EG101) and the wheel set (W100) at the rear left side of the loading end, a continuous variable transmission (CVT200) being installed between the right end output shaft (1012) and the wheel (W200) at the rear right side, and a continuous variable transmission (CVT300) being installed between the left end output shaft (1021) of the second epicyclic gear set (EG102) and the wheel set (W300) at the front left side, and a continuous variable transmission (CVT400) being installed between the right end output shaft (1022) and the wheel set (W400) at the front right side, according to one embodiment of the present invention.

As shown in FIG. 4, the present invention utilizes the rotary output end of the rotary kinetic power source (P100) of the common load body (L100) to directly or through the transmission device (T101) to drive the first epicyclic gear set (EG101), and the continuous variable transmission (CVT100) is individually installed between the left end output shaft (1011) of the two output ends of the first epicyclic gear set (EG101) and the wheel set (W100) at the rear left side of the loading end at the left side of the common load body (L100), and the continuous variable transmission (CVT200) is individually installed between the right end output shaft (1012) and the wheel set (W200) at the rear right side of the loading end at the right side of the common load body (L100); the rotary output end of the rotary kinetic power source (P100) is directly or through the transmission device (T101) to drive the second epicyclic gear set (EG102), and the continuous variable transmission (CVT300) is individually installed between the left end output shaft (1021) of the two output ends of the second epicyclic gear set (EG102) and the wheel set (W300) at the front left side of the loading end at the left side of the common load body (L100), and the continuous variable transmission (CVT400) is individually installed between the right end output shaft (1022) and the wheel set (W400) at the front right side of the loading end at the right side of the common load body (L100), thereby forming the drive system capable of being operated in the differential speed state, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the first epicyclic gear set (EG101) and the second epicyclic gear set (EG102); the transmission device (T101) can be optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts capable of differentially operating is served to drive the input end of the continuous variable transmission (CVT100), and the right end output shaft (1012) thereof is served to drive the input end of the continuous variable transmission (CVT200);

second epicyclic gear set (EG102): constituted by an epicyclic gear set having an input shaft and two output shafts capable of differentially operating, directly driven by the rotary kinetic power provided by the engine, or driven by the engine through the transmission device (T101); the left end output shaft (1021) of the two output shafts capable of differentially operating is served to drive the input end of the continuous variable transmission (CVT300), and the right end output shaft (1022) is served to drive the input end of the continuous variable transmission (CVT400);

continuous variable transmission (CVT100), (CVT200), (CVT300), (CVT400): the continuous variable transmission (CVT) is in the structural configuration capable of automatically changing speed ratio upon passively receiving the driving rotational speed and/or the loading torque, or is subject to the external control to actively change speed ratio, such as a rubber belt type, metal belt type, chain type continuous variable transmission, or an electric continuous variable transmission (ECVT), or a friction disk type, or a conventional different-shaft type continuous variable transmission;

operation interface (MI100): related to a linear analog type, or digital type or hybrid type control device, and constituted by an operation mechanism and/or electromechanical device and/or solid state electric circuit, provided for controlling the operation status of the rotary kinetic power source (P100), and/or controlling the operation of the continuous variable transmission (CVT 100) and/or the continuous variable transmission (CVT200) and/or the continuous variable transmission (CVT300), and/or the continuous variable transmission (CVT400);

stabilize device (SDT100), (STD200): constituted by a limited slip differential, or a dual shaft connecting device composed of a coupling device having slip damp coupling torque, including a stabilize device with the dual shaft structure configured through fluid viscous effect, hydrodynamic damp effect, mechanical friction effect, electromagnetic vortex effect or power generation reverse torque effect; wherein two rotating ends of the stabilize device (SDT100) are respectively connected between the wheel set (W100) at the rear left side and the wheel set (W200) at the rear right side of the loading end, and two rotating ends of the stabilize device (SDT200) are respectively connected between the wheel set (W300) at the front left side and the wheel set (W400) at the front right side of the loading end; during the driving operation, if the load varying at the individual two sides of the loading end causes the unstable operation, with the slip damp coupling torque of the stabilize device (SDT100) and/or the stabilize device (SDT200) installed between the two opposite wheel sets at the left and right sides, the operation of the system can be stabilized; the stabilize device (SDT100) and/or the stabilize device (SDT200) can be optionally installed according to actual needs;

According to the embodiment disclosed in FIG. 4, the input end or the output end of the continuous variable transmission or the input end of the wheel set can be further installed with a transmission device, wherein:

transmission device (T100), (T200), (T300), (T400): the output end of the transmission device (T100) is served to drive the wheel set (W100) at the rear left side of the loading end, and the input end thereof is driven by the rotary kinetic power from the output end of the continuous variable transmission (CVT100); the output end of the transmission device (T200) is served to drive the wheel set (W200) at the rear right side, and the input end thereof is driven by the rotary kinetic power from the output end of the continuous variable transmission (CVT200); the output end of the transmission device (T300) is served to drive the wheel set (W300) at the front left side of the loading end, and the input end thereof is driven by the rotary kinetic power from the output end of the continuous variable transmission (CVT300); the output end of the transmission device (T400) is served to drive the wheel set (W400) at the front right side, and the input end thereof is driven by the rotary kinetic power from the output end of the continuous variable transmission (CVT400); the transmission devices (T100), (T200), (T300), (T400) are consisted of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter; the transmission devices (T100), (T200) and/or (T300), (T400) can be optionally installed according to actual needs;

According to the embodiment disclosed in FIG. 4, between the output end of the continuous variable transmission individually installed on individual wheel set and the loading end, a clutch device can be further installed between the output end of the continuous variable transmission to the transmission chain of the input end of the wheel set used for distal driving, wherein:

clutch device (CL100), (CL200), (CL300), (CL400): the clutch device (CL100) is installed between the output end of the continuous variable transmission (CVT100) and the wheel set (W100) for controlling the continuous variable transmission (CVT100) to output the rotary kinetic power to the wheel set (W100), the clutch device (CL200) is installed between the output end of the continuous variable transmission (CVT200) and the wheel set (W200) for controlling the continuous variable transmission (CVT200) to output the rotary kinetic power to the wheel set (W200), the clutch device (CL300) is installed between the output end of the continuous variable transmission (CVT300) and the wheel set (W300) for controlling the continuous variable transmission (CVT300) to output the rotary kinetic energy to the wheel set (W300), and the clutch device (CL400) is installed between the output end of the continuous variable transmission (CVT400) and the wheel set (W400) for controlling the continuous variable transmission (CVT400) to output the rotary kinetic energy to the wheel set (W400); the clutch devices (CL100), (CL200), (CL300), (CL400) include being controlled by manual force or centrifugal force, or controlled through the operation interface (MI100), and formed as a clutch device or structure driven by electric force and/or magnetic force and/or mechanical force and/or pressure and/or hydraulic force for performing transmission engaging or releasing, and having a rotary input end and a rotary output end; the clutch devices (CL100, CL200, CL300, CL400) can be optionally installed upon actual needs;

According to the embodiment shown in FIG. 4, the common load body (L100) can be provided with one or more than one non-powered wheels according to actual needs;

With the operation of the mentioned devices, when the common load body (L100) is driven to operate by the rotary kinetic power source (P100), and the wheel set (W100) at the rear left side and the wheel set (W200) at the rear right side of the loading end are operated in differential speeds, the speed ratios of the continuous variable transmission (CVT100) and the continuous variable transmission (CVT200) are individually adjusted along with the load varying of the wheel set (W100) and the wheel set (W200) of the loading end, and the two output ends of the first epicyclic gear set (EG101) perform differential operation for adjustment, so as to drive in differential speed between the input end of the continuous variable transmission (CVT100) and the input end of the continuous variable transmission (CVT200); when the wheel set (W300) at the front left side and the wheel set (W400) at the front right side of the loading end are operated in differential speeds, the speed ratios of the continuous variable transmission (CVT300) and the continuous variable transmission (CVT400) are individually adjusted along with the load varying of the wheel set (W300) and the wheel set (W400) of the loading end, and the left end output shaft (1021) and the right end output shaft (1022) of the two output ends of the second epicyclic gear set (EG102) perform differential operation for adjustment so as to drive in differential speed between the input end of the continuous variable transmission (CVT300) and the input end of the continuous variable transmission (CVT400).

Figure 5:
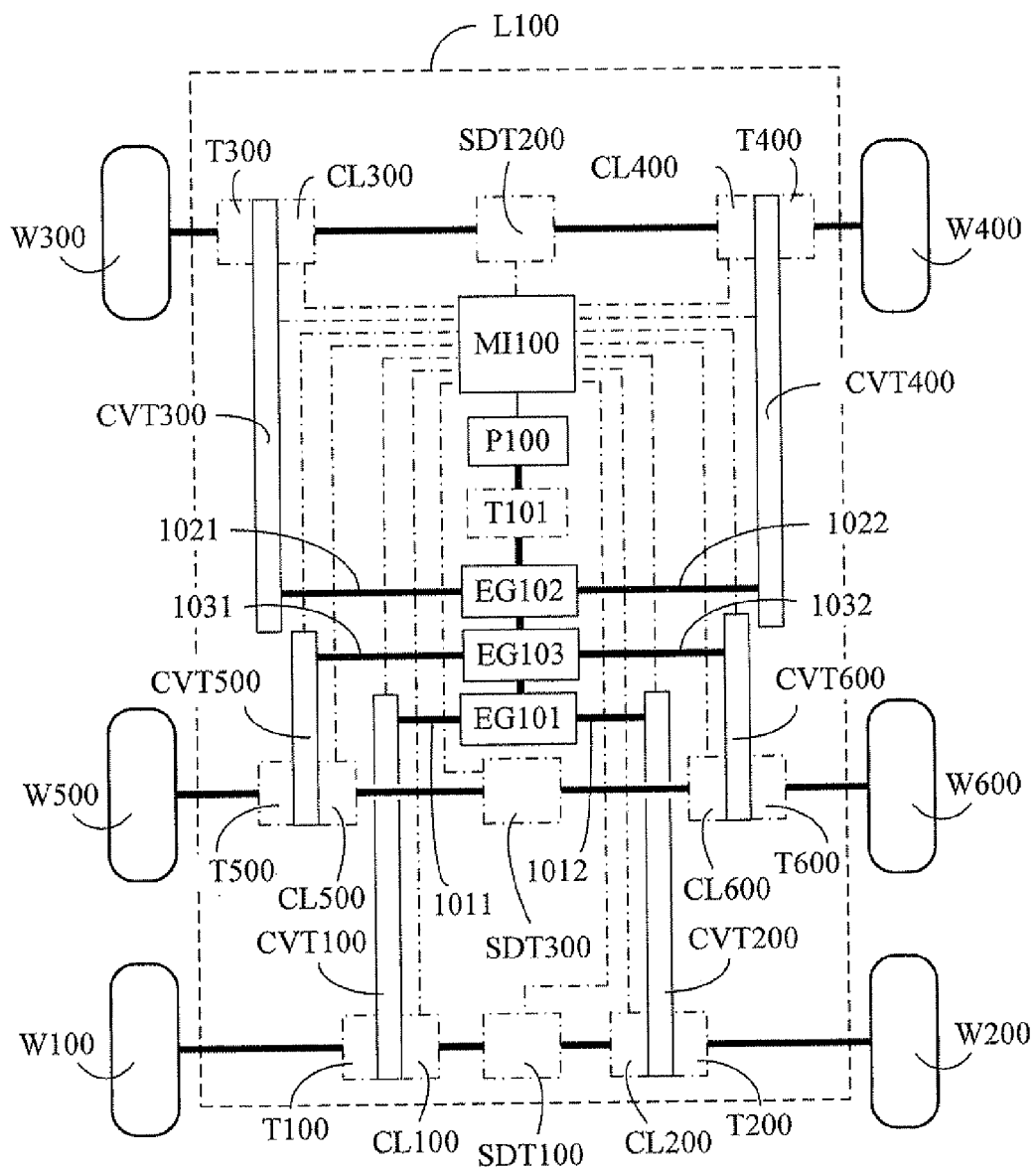
FIG. 5 is a schematic view illustrating FIG. 3 being further installed with a first epicyclic gear seat (EG101), a second epicyclic gear set (EG102) and a third epicyclic gear set (EG103) driven by the rotary kinetic power of the rotary kinetic power source (P100), and a continuous variable transmission (CVT100) being installed between the left end output shaft (1011) of the first epicyclic gear set (EG101) and the wheel set (W100) at the rear left side of the loading end, a continuous variable transmission (CVT200) being installed between the right end output shaft (1012) and the wheel set (W200) at the rear right side, a continuous variable transmission (CVT300) being installed between the left end output shaft (1021) of the second epicyclic gear set (EG102) and the wheel set (W300) at the front left side, a continuous variable transmission (CVT400) being installed between the right end output shaft (1022) and the wheel set (W400) at the front right side, a continuous variable transmission (CVT500) being installed between the left end output shaft (1031) of the third epicyclic gear set (EG103) and the wheel set (W500) at the middle left side, and a continuous variable transmission (CVT600) being installed between the right end output shaft (1032) and the wheel set (W600) at the middle right side, according to one embodiment of the present invention.

FIG. 5 is a schematic view illustrating FIG. 3 being further installed with a first epicyclic gear seat (EG101), a second epicyclic gear set (EG102) and a third epicyclic gear set (EG103) driven by the rotary kinetic power of the rotary kinetic power source (P100), and a continuous variable transmission (CVT100) being installed between the left end output shaft (1011) of the first epicyclic gear set (EG101) and the wheel set (W100) at the rear left side of the loading end, a continuous variable transmission (CVT200) being installed between the right end output shaft (1012) and the wheel set (W200) at the rear right side, a continuous variable transmission (CVT300) being installed between the left end output shaft (1021) of the second epicyclic gear set (EG102) and the wheel set (W300) at the front left side, a continuous variable transmission (CVT400) being installed between the right end output shaft (1022) and the wheel set (W400) at the front right side, a continuous variable transmission (CVT500) being installed between the left end output shaft (1031) of the third epicyclic gear set (EG103) and the wheel set (W500) at the middle left side, and a continuous variable transmission (CVT600) being installed between the right end output shaft (1032) and the wheel set (W600) at the middle right side, according to one embodiment of the present invention.

As shown in FIG. 5, the present invention utilizes the rotary output end of the rotary kinetic power source (P100) of the common load body (L100) to directly or through the transmission device (T101) to drive the first epicyclic gear set (EG101), and the continuous variable transmission (CVT100) is individually installed between the left end output shaft (1011) of the two output ends of the first epicyclic gear set (EG101) and the wheel set (W100) at the rear left side of the loading end at the left side of the common load body (L100), and the continuous variable transmission (CVT200) is individually installed between the right end output shaft (1012) and the wheel set (W200) at the rear right side of the loading end at the right side of the common load body (L100); and utilizes the rotary output end of the rotary kinetic power source (P100) to directly or through the transmission device (T101) to drive the second epicyclic gear set (EG102), and the continuous variable transmission (CVT300) is individually installed between the left end output shaft (1021) of the two output ends of the second epicyclic gear set (EG102) and the wheel set (W300) at the front left side of the loading end at the left side of the common load body (L100), and the continuous variable transmission (CVT400) is individually installed between the right end output shaft (1022) and the wheel set (W400) at the front right side of the loading end at the right side of the common load body (L100); and utilizes the rotary output end of the rotary kinetic power source (P100) to directly or through the transmission device (T101) to drive the third epicyclic gear set (EG103), and the continuous variable transmission (CVT500) is individually installed between the left end output shaft (1031) of the two output ends of the third epicyclic gear set (EG103) and the wheel set (W500) at the middle left side of the loading end at the left side of the common load body (L100), and the continuous variable transmission (CVT600) is individually installed between the right end output shaft (1032) and the wheel set (W600) at the middle right side of the loading end at the right side of the common load body (L100), thereby forming the drive system capable of being operated in the differential speed state, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the first epicyclic gear set (EG101) and the second epicyclic gear set (EG102) and the third epicyclic gear set (EG103); the transmission device (T101) can be optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts capable of differentially operating is served to drive the input end of the continuous variable transmissions (CVT100), and the right end output shaft (1012) thereof is served to drive the input end of the continuous variable transmission (CVT200);

second epicyclic gear set (EG102): constituted by an epicyclic gear set having an input shaft and two output shafts capable of differentially operating, directly driven by the rotary kinetic power provided by the engine, or driven by the engine through the transmission device (T101); the left end output shaft (1021) of the two output shafts capable of differentially operating is served to drive the input end of the continuous variable transmission (CVT300), and the right end output shaft (1022) thereof is served to drive the input end of the continuous variable transmission (CVT400);

third epicyclic gear set (EG103): constituted by an epicyclic gear set having an input shaft and two output shafts capable of differentially operating, directly driven by the rotary kinetic power provided by the engine, or driven by the engine through the transmission device (T101); the left end output shaft (1031) of the two output shafts capable of differentially operating is served to drive the input end of the continuous variable transmission (CVT500), and the right end output shaft (1032) thereof is served to drive the input end of the continuous variable transmission (CVT600);

continuous variable transmission (CVT100), (CVT200), (CVT300), (CVT400), (CVT500), (CVT600): the continuous variable transmission (CVT) is in the structural configuration capable of automatically changing speed ratio upon passively receiving the driving rotational speed and/or the loading torque, or is subject to the external control to actively change speed ratio, such as a rubber belt type, metal belt type, chain type continuous variable transmission, or an electric continuous variable transmission (ECVT), or a friction disk type, or a conventional different-shaft type continuous variable transmission;

operation interface (M1100): related to a linear analog type, or digital type or hybrid type control device, and constituted by an operation mechanism and/or electromechanical device and/or solid state electric circuit, provided for controlling the operation status of the rotary kinetic power source (P100), and/or controlling the operation of the continuous variable transmission (CVT100) and/or the continuous variable transmission (CVT200) and/or the continuous variable transmission (CVT300), and/or the continuous variable transmission (CVT400), and/or the continuous variable transmission (CVT500), and/or the continuous variable transmission (CVT600);

stabilize device (SDT100), (STD200), (STD300): constituted by a limited slip differential, or a dual shaft connecting device composed of a coupling device having slip damp coupling torque, including a stabilize device with the dual shaft structure configured through fluid viscous effect, hydrodynamic damp effect, mechanical friction effect, electromagnetic vortex effect or power generation reverse torque effect; wherein two rotating ends of the stabilize device (SDT100) are respectively connected between the wheel set (W100) at the rear left side and the wheel set (W200) at the rear right side of the loading end, two rotating ends of the stabilize device (SDT200) are respectively connected between the wheel set (W300) at the front left side and the wheel set (W400) at the front right side of the loading end, and two rotating ends of the stabilize device (SDT300) are respectively connected between the wheel set (W500) at the middle left side and the wheel set (W600) at the middle right side of the loading end; during the driving operation, if the load varying at the individual two sides of the loading end causes the unstable operation, with the slip damp coupling torque of the stabilize device (SDT100) and/or the stabilize device (SDT200) and/or the stabilize device (SDT300) installed between the two opposite wheel sets at the left and right sides, the operation of the system can be stabilized; the stabilize device (SDT100) and/or the stabilize device (SDT200) and/or the stabilize device (SDT300) can be optionally installed according to actual needs;

According to the embodiment disclosed in FIG. 5, the input end or the output end of the continuous variable transmission or the input end of the wheel set can be further installed with a transmission device, wherein:

transmission device (T100), (T200), (T300), (T400), (T500), (T600): the output end of the transmission device (T100) is served to drive the wheel set (W100) at the rear left side of the loading end, and the input end thereof is driven by the rotary kinetic power from the output end of the continuous variable transmission (CVT100); the output end of the transmission device (T200) is served to drive the wheel set (W200) at the rear right side, and the input end thereof is driven by the rotary kinetic power from the output end of the continuous variable transmission (CVT200); the output end of (T300) is served to drive the wheel set (W300) at the front left side of the loading end, and the input end thereof is driven by the rotary kinetic power from the output end of the continuous variable transmission (CVT300); the output end of the transmission device (T400) is served to drive the wheel set (W400) at the front right side, and the input end thereof is driven by the rotary kinetic power from the output end of the continuous variable transmission (CVT400); the output end of the transmission device (T500) is served to drive the wheel set (W500) at the middle left side of the loading end, and the input end thereof is driven by the rotary kinetic power from the output end of the continuous variable transmission (CVT500); the output end of the transmission device (T600) is served to drive the wheel set (W600) at the middle right side of the loading end, and the input end is driven by the rotary kinetic power from the output end of the continuous variable transmission (CVT600); the transmission devices (T100), (T200), (T300), (T400), (T500), (T600) are consisted of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter; the transmission devices (T100), (T200) and/or (T300), (T400), (T500), (T600) can be optionally installed according to actual needs;

According to the embodiment disclosed in FIG. 5, between the output end of the continuous variable transmission individually installed on individual wheel set and the loading end, a clutch device can be further installed between the output end of the continuous variable transmission to the transmission chain of the input end of the wheel set used for distal driving, wherein:

clutch device (CL100), (CL200), (CL300), (CL400), (CL500), (CL600): the clutch device (CL100) is installed between the output end of the continuous variable transmission (CVT100) and the wheel set (W100) for controlling the continuous variable transmission (CVT100) to output the rotary kinetic power to the wheel set (W100), the clutch device (CL200) is installed between the output end of the continuous variable transmission (CVT200) and the wheel set (W200) for controlling the continuous variable transmission (CVT200) to output the rotary kinetic power to the wheel set (W200), the clutch device (CL300) is installed between the output end of the continuous variable transmission (CVT300) and the wheel set (W300) for controlling the continuous variable transmission (CVT300) to output the rotary kinetic energy to the wheel set (W300), the clutch device (CL400) is installed between the output end of the continuous variable transmission (CVT400) and the wheel set (W400) for controlling the continuous variable transmission (CVT400) to output the rotary kinetic energy to the wheel set (W400), the output end clutch device (CL500) is installed between the output end of the continuous variable transmission (CVT500) and the wheel set (W500) for controlling the continuous variable transmission (CVT500) to output the rotary kinetic power to the wheel set (W500), and the output end clutch device (CL600) is installed between the output end of the continuous variable transmission (CVT600) and the wheel set (W600) for controlling the continuous variable transmission (CVT600) to output the rotary kinetic power to the wheel set (W600); the clutch devices (CL100), (CL200), (CL300), (CL400), (CL500), (CL600) include being controlled by manual force or centrifugal force, or controlled through the operation interface (MI100), and formed as a clutch device or structure driven by electric force and/or magnetic force and/or mechanical force and/or pressure and/or hydraulic force for performing transmission engaging or releasing, and having a rotary input end and a rotary output end; the clutch devices (CL100, CL200, CL300, CL400, CL500, CL600) can be optionally installed upon actual needs;

According to the embodiment shown in FIG. 5, the common load body (L100) can be provided with one or more than one non-powered wheels according to actual needs;

With the operation of the mentioned devices, when the common load body (L100) is driven to operate by the rotary kinetic power source (P100), and the wheel set (W100) at the rear left side and the wheel set (W200) at the rear right side of the loading end are operated in differential speeds, the speed ratios of the continuous variable transmission (CVT 100) and the continuous variable transmission (CVT200) are individually adjusted along with the load varying of the wheel set (W100) and the wheel set (W200) of the loading end, and the two output ends of the first epicyclic gear set (EG101) perform differential operation for adjustment, so as to drive in differential speed between the input end of the continuous variable transmission (CVT100) and the input end of the continuous variable transmission (CVT200); when the wheel set (W300) at the front left side and the wheel set (W400) at the front right side of the loading end are operated in differential speeds, the speed ratios of the continuous variable transmission (CVT300) and the continuous variable transmission (CVT400) are individually adjusted along with the load varying of the wheel set (W300) and the wheel set (W400) of the loading end, and the left end output shaft (1021) and the right end output shaft (1022) of the two output ends of the second epicyclic gear set (EG102) perform differential operation for adjustment so as to drive in differential speed between the input end of the continuous variable transmission (CVT300) and the input end of the continuous variable transmission (CVT400); accordingly, when the wheel set (W500) at the middle left side and the wheel set (W600) at the middle right side of the loading end are operated in differential speeds, the speed ratios of the continuous variable transmission (CVT500) and the continuous variable transmission (CVT600) are individually adjusted along with the load varying of the wheel set (W500) and the wheel set (W600) of the loading end, and the left end output shaft (1031) and the right end output shaft (1032) of the two output ends of the third epicyclic gear set (EG103) perform differential operation for adjustment, so as to drive in differential speed between the input end of the continuous variable transmission (CVT500) and the input end of the continuous variable transmission (CVT600).

What shall be explained is that FIG. 4 and FIG. 5 are examples of the multi-CVT drive system having epicyclic gear set, when being applied in a loading end wheel set having more individual epicyclic gear sets and continuous variable transmissions, the structured system can be formed with the same means disclosed above, wherein the limited slip differential or the stabilize device composed of the dual shaft connecting device having slip coupling torque installed at opposite locations horizontally and coaxially defined at two sides along the driving direction of the common load body (L100) and between the same transmission operation sets, or the transmission device, or the clutch device installed between the individual CVT to the wheel set can be all or partially installed or none of the above is installed.

The invention claimed is:

1. A multi-CVT drive system, comprising:
   a rotary kinetic power source (P100);
   an epicyclic gear set (EG101) having a left output shaft (1011) and a right output shaft (1012);
   a first continuously variable transmission (CVT100) and a second continuously variable transmission (CVT200), wherein rotary kinetic power output by the rotary kinetic power source (P100) drives the epicyclic gear set (EG101) and said continuously variable transmissions (CVT100,CVT200) are respectively installed between the left end output shaft (1011) and the right end output shaft (1012) of the epicyclic gear set (EG101) and respective individual loads including wheel sets (W100, W200), the respective individual loads being driven by respective ones of the two output shafts (1011,1012), so that the wheel sets (W100,W200) of the individual loads driven by the two output shafts (1011,1012) are enabled to perform variation of the driving speed ratio and the driving torque and drive a combined common load body (L100); and
   a stabilizer device (SDT100) composed of one of a limited slip differential and a dual shaft connecting device having slip coupling torque and connected to the drive system at the following horizontally and coaxially opposite locations on two sides of the common load body (L100), such that when a differential operation is performed between the two individual loads including wheel sets (W100,W200), the stabilizer device (SDT100) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT100) being installed at left and right sides of the common load body (L100).

2. A multi-CVT drive system as claimed in claim 1, wherein said stabilizer device (SDT100) is installed in one of the following configurations:
   (1) between rotating parts of the wheel sets (W100,W200) oppositely at the left side and the right side;
   (2) between opposite output ends of the first and second continuously variable transmissions (CVT100, CVT200) at the left side and the right side;

(3) between opposite output ends of clutch devices (CL100,CL200) at the left side and the right side;
(4) between input ends or output ends of respective left side and right side transmission devices (T100,T200) oppositely at the left side and the right side;
(5) between a left side rotating part of one of the wheel sets (W100) and a right side rotating part of another of the wheel sets (W200).

3. A multi-CVT drive system as claimed in claim 1, wherein the common load body (L100) is a frame body of a vehicle, on which is installed the rotary kinetic power source (P100), corresponding operation and transmission interface devices, and at least the loading wheel sets (W100,W200) driven by the rotary kinetic power source (P100).

4. A multi-CVT drive system as claimed in claim 1, wherein when the common load body (L100) is driven to operate by the rotary kinetic power source (P100), and the first wheel set (W100) and the second wheel set (W200) are operated in different speeds, the speed ratios of the first continuously variable transmission (CVT100) and the second continuously variable transmission (CVT200) are individually adjusted in response to load variation of the first wheel set (W100) and the second wheel set (W200) of the loading end, and the two output ends of the epicyclic gear set (EG101) perform differential operation adjustment to differentially drive the input ends of the first continuously variable transmission (CVT 100) and the second continuously variable transmission (CVT200), or the operation interface (MI100) is used to control the operation interface (MI100) so as to control the individual speed ratio adjustments between the first continuously variable transmission (CVT100) and the second continuously variable transmission (CVT200).

5. A multi-CVT drive system as claimed in claim 1, further comprising at least one transmission device (T100,T101, T200), each having one of a fixed speed ratio for acceleration, deceleration, or changing direction, and including one of a manually-operated, automatic, semi-automatic speed-ratio-varying, or belt type continuously variable transmission and a hydraulic torque converter, said at least one transmission device (T100,T101,T200) including at least one of a mechanical gear set, chain set, pulley set, and linkage rod set, and said at least one transmission device (T100,T101,T200) being installed at one or more of the following locations:
(1) at input ends of the first and second continuously variable transmissions (CVT100,CVT200);
(2) at output ends of the first and second continuously variable transmissions (CVT100,CVT200);
(3) at input ends of clutch devices, said clutch devices including a clutch device on a left side (CL100) and a clutch device on a right side (CL200);
(4) at an output end of one of the clutch devices (CL101); and
(5) at input ends of the wheel sets (W100,W200) at a loading end.

6. A multi-CVT drive system as claimed in claim 1, further comprising at least one clutch device (CL100,CL101, CL200), wherein said at least one clutch device is a manual clutch device, a centrifugal clutch device, or a clutch device controlled by an operation interface (MI100) that engages or release an output end of the at least one clutch device (CL100, CL101,CL200) by at least one of an electric force, magnetic force, mechanical force, pneumatic pressure, and hydraulic force, one or more of said at least one clutch device (CL100, CL101,CL200) being installed at one of the following locations:
(1) at the input ends of the continuously variable transmissions (CVT100,CVT200);
(2) at the output ends of the continuously variable transmissions (CVT100,CVT200);
(3) at an input end of at least one first transmission device (T101);
(4) at output ends of left side and right side transmission devices (T100,T200);
(5) at the input ends of the wheel sets (W100,W200) at the loading end.

7. A multi-CVT drive system as claimed in claim 1, wherein the rotary kinetic power source (P100) is one of an internal combustion engine, external combustion engine, spring power source, hydraulic power source, pneumatic pressure power source, flywheel power source, manually driven power source, wind power source, and power source composed of an AC or DC, brush or brushless, synchronous or non-synchronous, internal rotating or external rotating type rotary motor installed with relative control devices and supplied with electricity by at least one of an electrical power supply and electrical storage device.

8. A multi-CVT drive system as claimed in claim 1, further comprising a third continuously variable transmission (CVT300) installed between the left end output shaft (1011) of the epicyclic gear set (EG101) and a third wheel set (W300) at a front left side of the loading end of the common load body (L100), and fourth continuously variable transmission (CVT400) installed between the right end output shaft (1012) and a fourth wheel set (W400) at the front right side of the loading end of the common load body (L100), wherein an output end of the third continuously variable transmission (CVT300) drives the third wheel set (W300) at the left side of the loading end, and the input end of the third continuously variable transmission (CVT300) is driven by the rotary kinetic power from the left end output shaft (1011) at the output end of the epicyclic gear set (EG101); the output end of the fourth continuously variable transmission (CVT400) drives the fourth wheel set (W400) at the right side, and the input end of the fourth continuously variable transmission (CVT400) is driven by the rotary kinetic power from the right end output shaft (1012) at the output end of the epicyclic gear set (EG101).

9. A multi-CVT drive system as claimed in claim 8, further comprising third and fourth output end transmission devices (T300,T400) installed at one or more of the following locations:
(1) at input ends of the third and fourth continuously variable transmissions (CVT300,CVT400);
(2) at output ends of the third and fourth continuously variable transmissions (CVT300,CVT400);
(3) at input ends of third and fourth output end clutch devices on the left and right side (CL300,CL400); and
(4) at input ends of the third and fourth wheel sets (W300, W400) at a loading end, and
wherein at least one of said third and fourth output end clutch devices (CL300, CL400) is one of a manual or centrifugal clutch device, and a clutch controlled by an operation interface (MI100) that engages or release an output end of the at least one of the third and fourth clutch devices (CL300,CL400) by at least one of an electric force, magnetic force, mechanical force, pneumatic pressure, and hydraulic force, one or more of said at least one clutch devices (CL300,CL400) being installed at one of the following locations:
(1) at the input ends of the third and fourth continuously variable transmissions (CVT300,CVT400);
(2) at the output ends of the third and fourth continuously variable transmissions (CVT300,CVT400);

(3) at output ends of the third and fourth output end transmission devices (T300,T400);

(4) at the input ends of the third and fourth wheel sets (W300,W400) at the loading end.

10. A multi-CVT drive system as claimed in claim 9, further comprising a second stabilizer device (STD200) composed of one of a limited slip differential and a dual shaft connecting device having slip coupling torque and connected to the drive system at the following horizontally and coaxially opposite locations on two sides of front end of the common load body (L100), such that when a differential operation is performed between the two individual loads including wheel sets (W300,W400), the second stabilizer device (SDT200) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT200) being installed between parts of driving system at left and right sides of the common load body (L100) in one of the following configurations:

(1) between rotating parts of the third and fourth wheel sets (W300,W400) oppositely at the left side and the right side;

(2) between opposite output ends of the third and fourth continuously variable transmissions (CVT300, CVT400) at the left side and the right side;

(3) between opposite output ends of said third and fourth output end clutch devices (CL300,CL400) at the left side and the right side;

(4) between input ends or output ends of said third and fourth output end transmission devices (T300,T400) oppositely at the left side and the right side;

(5) between a left side rotating part of the third wheel set (W300) and a right side rotating part of the fourth wheel set (W400).

11. A multi-CVT drive system as claimed in claim 1, further comprising a second epicyclic gear set (EG102) connected between the first epicyclic gear set (EG101) and a first transmission device (T101), said second epicyclic gear set (EG102) including a second left end output shaft (1021) and a second right end output shaft (1022), and further comprising a third continuously variable transmission (CVT300) installed between the second left end output shaft (1021) of the second epicyclic gear set (EG102) and a third wheel set (W300) at a front left side of the loading end of the common load body (L100), and fourth continuously variable transmission (CVT400) installed between the second right end output shaft (1022) and a fourth wheel set (W400) at the front right side of the loading end of the common load body (L100), wherein an output end of the third continuously variable transmission (CVT300) drives the third wheel set (W300) at the left side of the loading end, and the input end of the third continuously variable transmission (CVT300) is driven by the rotary kinetic power from the second left end output shaft (1021) at the output end of the second epicyclic gear set (EG102); the output end of the fourth continuously variable transmission (CVT400) drives the fourth wheel set (W400) at the right side, and the input end of the fourth continuously variable transmission (CVT400) is driven by the rotary kinetic power from the second right end output shaft (1022) at the output end of the second epicyclic gear set (EG102).

12. A multi-CVT drive system as claimed in claim 11, further comprising third and fourth output end transmission devices (T300,T400) each having one of a fixed speed ratio for acceleration, deceleration, or changing direction, a manually-operated, automatic, or semi-automatic speed-ratio-varying continuously variable transmission, and a hydraulic torque converter, said third and fourth output end transmission devices (T300,T400) being installed at one or more of the following locations:

(1) at input ends of the third and fourth continuously variable transmissions (CVT300,CVT400);

(2) at output ends of the third and fourth continuously variable transmissions (CVT300,CVT400);

(3) at input ends of third and fourth output end clutch devices on the left and right side (CL300,CL400); and (4) at input ends of the third and fourth wheel sets (W300, W400) at a loading end, and wherein at least one of said third and fourth output end clutch devices (CL300, CL400) is one of a manual or centrifugal clutch device, and a clutch controlled by an operation interface that engages or release an output end of the at least one of the third and fourth clutch devices (CL300,CL400) by at least one of an electric force, magnetic force, mechanical force, pneumatic pressure, and hydraulic force, one or more of said at least one clutch devices (CL300,CL400) being installed at one of the following locations:

(1) at the input ends of the third and fourth continuously variable transmissions (CVT300,CVT400);

(2) at the output ends of the third and fourth continuously variable transmissions (CVT300,CVT400);

(3) at output ends of the third and fourth output end transmission devices (T300,T400);

(4) at the input ends of the third and fourth wheel sets (W300,W400) at the loading end.

13. A multi-CVT drive system as claimed in claim 12, further comprising a second stabilizer device (STD200) composed of one of a limited slip differential and a dual shaft connecting device having slip coupling torque and connected to the drive system at the following horizontally and coaxially opposite locations on two sides of front end of the common load body (L100), such that when a differential operation is performed between the two individual loads including wheel sets (W300,W400), the second stabilizer device (SDT200) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT200) being installed between parts of driving system at left and right sides of the common load body (L100) in one of the following configurations:

(1) between rotating parts of the third and fourth wheel sets (W300,W400) oppositely at the left side and the right side;

(2) between opposite output ends of the third and fourth continuously variable transmissions (CVT300, CVT400) at the left side and the right side;

(3) between opposite output ends of the third and fourth output end clutch devices (CL300,CL400) at the left side and the right side;

(4) between input ends or output ends of the third and fourth output end transmission devices (T300,T400) oppositely at the left side and the right side;

(5) between a left side rotating part of the third wheel set (W300) and a right side rotating part of the fourth wheel set (W400).

14. A multi-CVT drive system as claimed in claim 12, wherein the third continuously variable transmission (CVT300) is installed between the second left end output shaft (1021) of the second epicyclic gear set (EG102) and the third wheel set (W300) and the fourth continuously variable transmissions (CVT400) is installed between the second right end output shaft (1022) of the second epicyclic gear set (EG102) and the third wheel sets (W400), thereby forming a drive system capable of being operated at different speeds and in a variable speed state, wherein:

the second left end output shaft (1021) of the second epicyclic gear set (EG102) drives the input end of the third continuously variable transmission (CVT300), and the second right end output shaft (1022) of the epicyclic gear set (EG102) drives the input end of the fourth continuously variable transmission (CVT400);

the output end of the third continuously variable transmission (CVT300) drives the third wheel set (W300) and the output end of the fourth continuously variable transmission (CVT400) drives the fourth wheel set (W400);

the operation interface (MI100) directly controls at least one of the rotary kinetic power source (P100) and operation speed ratios of the third continuously variable transmission (CVT300), operation speed ratios of the fourth continuously variable transmission (CVT400), or controls at least one of the rotary kinetic power source (P100) and speed ratios of the third and fourth continuously variable transmissions (CVT300,CVT400);

an output end of the third output end transmission device (T300) drives the third wheel set (W300), and the input end thereof is driven by the rotary kinetic power from the output end of the third continuously variable transmission (CVT300); an output end of the fourth output end transmission device (T400) drives the fourth wheel set (W400), and the input end thereof is driven by the rotary kinetic power from the output end of the fourth continuously variable transmission (CVT400); said third output end transmission device (T300) and fourth output end transmission device (T400) being configured to be controlled by manual force or by the operation interface (MI100), configured to automatically change speed ratios in response to at least one of a driving rotational speed or a loading torque;

an output end of the third output end clutch device (CL300) is installed between the output end of the third continuously variable transmission (CVT300) and the third wheel set (W300) for controlling the third continuously variable transmission (CVT300) to output the rotary kinetic power to the third wheel set (W300), and an output end of the fourth output end clutch device (CL400) being installed between the output end of the fourth continuously variable transmission (CVT400) and the fourth wheel set (W400) for controlling the fourth continuously variable transmission (CVT400) to output the rotary kinetic power to the fourth wheel set (W400).

15. A multi-CVT drive system as claimed in claim 14, wherein when the common load body (L100) is driven to operate by the rotary kinetic power source (P100), and the third wheel set (W300) and the fourth wheel set (W400) are operated in different speeds, the speed ratios of the third continuously variable transmission (CVT300) and the fourth continuously variable transmission (CVT400) are individually adjusted in response to load variation of the third wheel set (W300) and the fourth wheel set (W400) of the loading end, and the two output ends of the second epicyclic gear set (EG102) perform differential operation adjustment to differentially drive the input ends of the third continuously variable transmission (CVT300) and the fourth continuously variable transmission (CVT400), or the operation interface (MI100) is used to control the operation interface (MI100) so as to control the individual speed ratio adjustments between the third continuously variable transmission (CVT300) and the fourth continuously variable transmission (CVT400).

16. A multi-CVT drive system as claimed in claim 1, wherein the common load body (L100) is further installed with non-powered wheels not being driven by the rotary kinetic power source (P100).

\* \* \* \* \*